United States Patent
Miyake et al.

(10) Patent No.: US 7,281,368 B2
(45) Date of Patent: Oct. 16, 2007

(54) $NO_x$ DISCHARGE QUANTITY ESTIMATION METHOD FOR INTERNAL COMBUSTION ENGINE

(75) Inventors: Teruhiko Miyake, Susono (JP); Shigeki Nakayama, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 193 days.

(21) Appl. No.: 10/540,012

(22) PCT Filed: Oct. 14, 2004

(86) PCT No.: PCT/JP2004/015545

§ 371 (c)(1),
(2), (4) Date: Jun. 22, 2005

(87) PCT Pub. No.: WO2005/045219

PCT Pub. Date: May 19, 2005

(65) Prior Publication Data
US 2006/0107651 A1    May 25, 2006

(30) Foreign Application Priority Data
Nov. 6, 2003  (JP) .............................. 2003-376456

(51) Int. Cl.
*F01N 3/00* (2006.01)

(52) U.S. Cl. ........................... 60/285; 60/274; 60/278; 60/297; 123/406.48; 123/403; 123/568.11

(58) Field of Classification Search ................. 60/274, 60/278, 285, 297, 276, 301; 123/406.45, 123/406.48, 430, 568.11
See application file for complete search history.

(56) References Cited

U.S. PATENT DOCUMENTS 5,775,099 A * 7/1998 Ito et al. ..................... 60/274
5,826,427 A * 10/1998 Yanagihara et al. .......... 60/276
5,884,476 A * 3/1999 Hirota et al. ................. 60/278
6,269,634 B1 * 8/2001 Yokota et al. ................ 60/286
6,279,537 B1   8/2001 Yonekura et al.

(Continued)

FOREIGN PATENT DOCUMENTS

DE     198 51 319 A1    5/2000

(Continued)

Primary Examiner—Binh Q. Tran
(74) Attorney, Agent, or Firm—Oliff & Berridge, PLC

(57) ABSTRACT

In an $NO_x$ discharge quantity estimation method for an internal combustion engine equipped with an EGR apparatus, the gas components (e.g., oxygen molecules and $NO_x$) of intake gas taken into a combustion chamber are assumed to be uniformly distributed throughout the entire region of the combustion chamber. Under such assumption, the combustion chamber is divided into a combustion region (region B) and a non-combustion region (region A) by making use of the ratio of the "mass of oxygen consumed as a result of combustion" to the "total mass of oxygen taken in the combustion chamber." Further, under the assumption that $NO_x$ generated as a result of combustion remains in the region B after combustion, and $NO_x$ present in the region A before combustion due to circulation of EGR gas is conserved after combustion, the quantity of $NO_x$ discharged from the exhaust passage to the outside is calculated in consideration of not only the quantity of combustion-generated $NO_x$ in the region B but also the quantity of circulated $NO_x$ in the region A.

9 Claims, 7 Drawing Sheets

U.S. PATENT DOCUMENTS

| | | | |
|---|---|---|---|
| 6,705,077 B2 * | 3/2004 | Uedahira et al. | 60/278 |
| 6,725,650 B2 * | 4/2004 | Nishimura | 60/285 |
| 6,826,471 B2 * | 11/2004 | Daudel et al. | 701/114 |

FOREIGN PATENT DOCUMENTS

| | | |
|---|---|---|
| EP | 1 408 331 A2 | 4/2004 |
| GB | 2 387 340 A | 10/2003 |
| JP | A 2002-047974 | 2/2002 |
| JP | A 2002-195071 | 7/2002 |
| JP | A 2002-371893 | 12/2002 |

\* cited by examiner

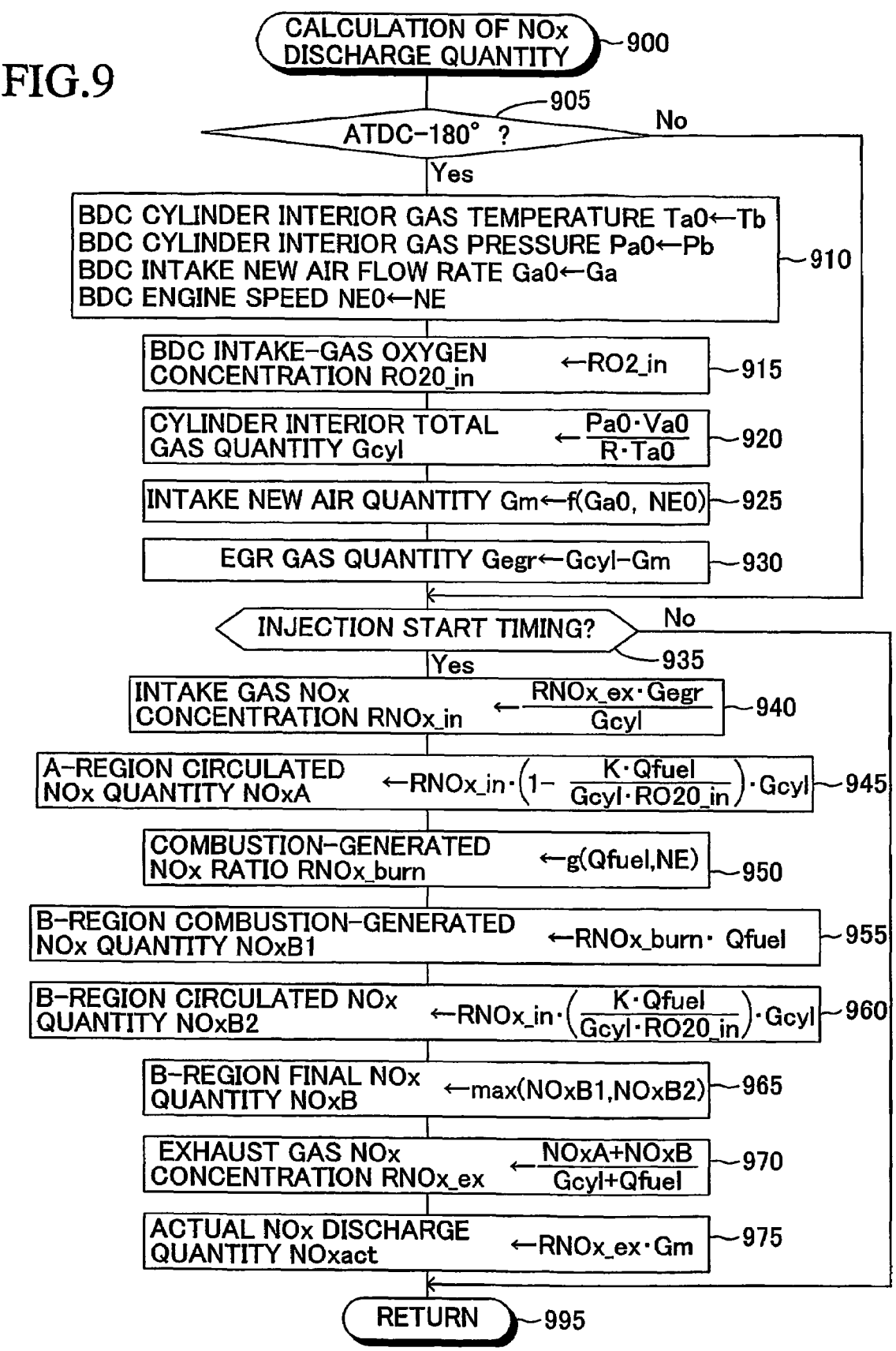

NO$_x$ DISCHARGE QUANTITY ESTIMATION METHOD FOR INTERNAL COMBUSTION ENGINE

TECHNICAL FIELD

The present invention relates to an NO$_x$ discharge quantity estimation method which is applied to an internal combustion engine equipped with an EGR apparatus for circulating to an intake passage a portion of exhaust gas flowing through an exhaust passage, and which is adapted to estimate the quantity of NO$_x$ contained in the exhaust gas discharged from the exhaust passage to the outside.

BACKGROUND ART

In an internal combustion engine such as a spark-ignition engine or a diesel engine, the quantity of NO$_x$ contained in exhaust gas discharged from an exhaust passage to the outside (hereinafter may be referred to as "NO$_x$ discharge quantity") must be reduced. An effective way of reducing the NO$_x$ discharge quantity is lowering the highest flame temperature (highest combustion temperature) through, for example, increasing the quantity of EGR gas circulated by means of an EGR apparatus, or delaying fuel injection timing.

However, when the quantity of EGR gas is increased in order to reduce the NO$_x$ discharge quantity, in the case of a diesel engine, the generation quantity of particulate matter (PM) increases. When fuel injection timing is delayed in order to reduce the NO$_x$ discharge quantity, fuel efficiency deteriorates.

Accordingly, in order to minimize the NO$_x$ discharge quantity in consideration of suppression of an increase in the discharge quantity of particulate matter (PM) and suppression of deterioration in fuel efficiency, the NO$_x$ discharge quantity is desirably controlled to a predetermined target value corresponding to the operating conditions of the engine. In order to accurately control the NO$_x$ discharge quantity to a predetermined target value, the NO$_x$ discharge quantity must be accurately estimated.

For such accurate estimation, a control apparatus for an internal combustion engine disclosed in Japanese Patent Application Laid-Open (kokai) No. 2002-371893 detects combustion pressure and intake-gas oxygen concentration by use of a cylinder pressure sensor and an intake-gas oxygen concentration sensor, and estimates the quantity of NO$_x$ generated as a result of combustion (hereinafter referred to as "combustion-generated NO$_x$ quantity") on the basis of combustion temperature and gas mixture concentration calculated on the basis of the combustion pressure and the intake-gas oxygen concentration, wherein the estimation is performed by use of the extended Zeldovich mechanism, which is a typical known combustion model. Then, EGR gas quantity, fuel injection timing, or the like is controlled so that the estimated combustion-generated NO$_x$ quantity coincides with a predetermined target combustion-generated NO$_x$ quantity, whereby the NO$_x$ discharge quantity is controlled to a predetermined target value.

Incidentally, in an internal combustion engine equipped with an EGR apparatus, NO$_x$ contained in EGR gas is circulated into a combustion chamber via the EGR apparatus. In addition, the above-mentioned combustion-generated NO$_x$ quantity is the quantity of NO$_x$ generated in the region which is a portion of the combustion chamber and in which combustion occurs (hereinafter referred to as "combustion region"). Accordingly, in the remaining portion of the combustion chamber (hereinafter referred to as "non-combustion region"), the circulated NO$_x$ remains after combustion. Therefore, in order to accurately estimate the NO$_x$ discharge quantity, not only the combustion-generated NO$_x$ quantity but also the "quantity of NO$_x$ remaining in the non-combustion region" must be taken into consideration.

However, in the above-mentioned conventional apparatus, the "quantity of NO$_x$ remaining in the non-combustion region" is not taken into consideration at all. Accordingly, when the conventional apparatus is applied to an internal combustion engine equipped with an EGR apparatus, NO$_x$ discharge quantity cannot be accurately estimated, and thus, the NO$_x$ discharge quantity cannot be accurately controlled to a predetermined target value.

DISCLOSURE OF THE INVENTION

In view of the foregoing, an object of the present invention is to provide an NO$_x$ discharge quantity estimation method used with an internal combustion engine equipped with an EGR apparatus, which method can accurately estimate the quantity of NO$_x$ discharged from an exhaust passage to the outside, in consideration of quantity of NO$_x$ remaining in a non-combustion region.

The NO$_x$ discharge quantity estimation method according to the present invention is applied to an internal combustion engine equipped with an EGR apparatus, and adapted to estimate a quantity of NO$_x$ contained in exhaust gas discharged from an exhaust passage of the engine to the outside (i.e., the above-mentioned NO$_x$ discharge quantity) in consideration of a quantity of NO$_x$ generated in a combustion chamber as a result of combustion (i.e., the above-mentioned combustion-generated NO$_x$ quantity) and a quantity of NO$_x$ circulated into the combustion chamber via the EGR apparatus.

The quantity of NO$_x$ circulated into the combustion chamber via the EGR apparatus (partially) serves as the above-mentioned "quantity of NO$_x$ remaining in the non-combustion region" after combustion. Accordingly, under the method of the present invention, the NO$_x$ discharge quantity can be estimated in consideration of not only the combustion-generated NO$_x$ quantity, but also the "quantity of NO$_x$ remaining in the non-combustion region." Therefore, the NO$_x$ discharge quantity can be accurately estimated.

A more specific method for estimating NO$_x$ discharge quantity according to the present invention, which is applied to an internal combustion engine equipped with an EGR apparatus, comprises the steps of estimating a combustion region, the combustion region being a region of the combustion chamber in which combustion occurs; estimating, as a combustion-generated NO$_x$ quantity, a quantity of NO$_x$ generated in the combustion region as a result of combustion, and an NO$_x$ quantity in a non-combustion region, the non-combustion region being the remaining region of the combustion chamber; and estimating, on the basis of the combustion-generated NO$_x$ quantity and the NO$_x$ quantity in the non-combustion region, a quantity of NO$_x$ contained in exhaust gas discharged from the exhaust passage to the outside.

Under this method, the NO$_x$ discharge quantity can be estimated in consideration of not only the combustion-generated NO$_x$ quantity; i.e., the quantity of NO$_x$ which is generated in the estimated combustion region as a result of combustion, but also the NO$_x$ quantity in the non-combustion region (after combustion); i.e., the above-mentioned "quantity of $NO_x$ remaining in the non-combustion region." Thus, the $NO_x$ discharge quantity can be accurately estimated.

In this case, the $NO_x$ quantity in the non-combustion region to be estimated is preferably a non-combustion-region circulated $NO_x$ quantity which represents a quantity of a portion of $NO_x$ circulated into the combustion chamber via the EGR apparatus, the portion of the circulated $NO_x$ being present in the non-combustion region before combustion.

Combustion within the combustion chamber occurs only in the combustion region, and does not occur in the non-combustion region. Therefore, of the quantity of $NO_x$ circulated into the combustion chamber via the EGR apparatus, the quantity of $NO_x$ present within the non-combustion region before combustion (before the start of combustion) (hereinafter referred to as "non-combustion-region circulated $NO_x$ quantity") can be considered to be conserved (held) as is after combustion. In other words, the non-combustion-region circulated $NO_x$ quantity can be used as the "quantity of $NO_x$ remaining in the non-combustion region." Accordingly, through employment of the above-scheme, the "quantity of $NO_x$ remaining in the non-combustion region" can be accurately estimated by use of a simple configuration (combustion model). As a result, the $NO_x$ discharge quantity can be accurately estimated through simple calculation.

Moreover, the combustion-generated NOx quantity is preferably estimated in such a manner that when the combustion-region circulated $NO_x$ quantity is greater than the combustion-generated $NO_x$ quantity, the combustion-region circulated $NO_x$ quantity is employed as the combustion-generated NOx quantity (which serves as the quantity of $NO_x$ remaining in the combustion region after combustion), wherein the combustion-region circulated $NO_x$ quantity represents a quantity of a portion of $NO_x$ circulated into the combustion chamber via the EGR apparatus, the portion of the circulated $NO_x$ being present in the combustion region before combustion.

Before start of combustion, $NO_x$ circulated into the combustion chamber via the EGR apparatus (i.e., the above-mentioned combustion-region circulated $NO_x$ quantity) is present in the combustion region, and after combustion, $NO_x$ generated as result of combustion (i.e., the above-mentioned combustion-generated NOx quantity) is added thereto. In general, nitrogen molecules $N_2$ and $NO_x$ (in particular, carbon monoxide NO) are substances which can generate each other through reversible reaction. Therefore, the $NO_x$ quantity ($NO_x$ concentration) of a gas after a chemical reaction is determined, irrespective of $NO_x$ quantity ($NO_x$ concentration) before the chemical reaction, by means of chemical equilibrium, in accordance with the temperature of gas after the chemical reaction (in such a manner that the higher the gas temperature, the greater the $NO_x$ quantity ($NO_x$ concentration)).

Moreover, in an ordinary operating state of the engine, in many cases the combustion-generated $NO_x$ quantity (quantity of $NO_x$ generated within gas having an increased temperature as a result of combustion) is greater than the above-described combustion-region circulated $NO_x$ quantity. Accordingly, basically, the quantity of $NO_x$ generated as a result of combustion can be considered to be substantially equal to the combustion-generated $NO_x$ quantity (which serves as the quantity of $NO_x$ remaining in the combustion region after combustion).

However, in a case where the $NO_x$ concentration of EGR gas is considerably high and fuel injection quantity is very small because of a very small accelerator opening, the combustion-region circulated $NO_x$ quantity increases, and the combustion-generated $NO_x$ quantity decreases because of a small increase in gas temperature stemming from combustion. As a result, the combustion-region circulated $NO_x$ quantity becomes greater than the combustion-generated $NO_x$ quantity in some cases. In such a case, the combustion-region circulated $NO_x$ quantity, rather than the combustion-generated $NO_x$ quantity, is considered to be a more accurate representation of the combustion-generated $NO_x$ quantity (which serves as the "quantity of $NO_x$ remaining in the combustion region after combustion").

In other words, the combustion-generated $NO_x$ quantity (which serves as the quantity of $NO_x$ remaining in the combustion region after combustion) is preferably estimated by selecting the larger one of the combustion-region circulated $NO_x$ quantity and the combustion-generated NOx quantity (generated after combustion). Accordingly, through employment of the above scheme, the combustion-generated $NO_x$ quantity (which serves as the quantity of $NO_x$ remaining in the combustion region after combustion) can be accurately estimated by use of a simple configuration (combustion model). As a result, the $NO_x$ discharge quantity can be accurately estimated through simple calculation.

In the $NO_x$ discharge quantity estimation method according to the present invention, the $NO_x$ discharge quantity is preferably estimated by the steps of estimating an $NO_x$ concentration of exhaust gas on the basis of the combustion-generated $NO_x$ quantity and the $NO_x$ quantity in the non-combustion region; and estimating the $NO_x$ discharge quantity by multiplying the $NO_x$ concentration by a quantity of the exhaust gas discharged from the exhaust passage to the outside.

The $NO_x$ concentration of exhaust gas discharged from the engine to the exhaust passage via the exhaust valve can be easily calculated as the ratio, to the total quantity of gas within the combustion chamber, of the "sum of the combustion-generated $NO_x$ quantity and the $NO_x$ quantity in the non-combustion region." Moreover, when the $NO_x$ concentration of exhaust gas flowing through the exhaust passage is assumed to be constant throughout the entire region of the exhaust passage, the $NO_x$ concentration of exhaust gas discharged from the engine to the exhaust passage via the exhaust valve becomes equal to the $NO_x$ concentration of the exhaust gas discharged to the outside from the exhaust passage.

Accordingly, as described above, the $NO_x$ concentration of exhaust gas (at the time of discharge from the engine to the exhaust passage via the valve), is calculated on the basis of the combustion-generated $NO_x$ quantity and the $NO_x$ quantity in the non-combustion region, and the $NO_x$ concentration is multiplied by the quantity of the exhaust gas discharged from the exhaust passage to the outside. Thus, the $NO_x$ discharge quantity, the quantity of $NO_x$ discharged from the exhaust passage to the outside, can be accurately estimated in a simple manner.

In this case, the quantity of new air taken in the intake passage (hereinafter may be referred to as "intake new air quantity") is advantageously used as the quantity of the exhaust gas discharged from the exhaust passage to the outside. In general, a device for measuring the intake new air quantity, such as airflow meter, is provided in the intake passage of the engine in order to measure the quantity of new air taken in the intake passage. Further, in an ordinary operating state of the engine (in particular, in a steady operation state), the quantity of the exhaust gas discharged from the exhaust passage to the outside becomes substantially equal to the intake new air quantity.

Accordingly, with this scheme, the quantity of $NO_x$ discharged from the exhaust passage to the outside can be estimated without provision of an additional device for measuring the quantity of exhaust gas discharged from the exhaust passage to the outside. As a result, the $NO_x$ discharge quantity can be accurately estimated by use of a simple configuration.

In the $NO_x$ discharge quantity estimation method according to the present invention, the combustion region is preferably estimated by the steps of estimating a quantity of oxygen taken in the combustion chamber and a quantity of oxygen consumed as a result of combustion; and estimating the combustion region by use of a ratio of the quantity of oxygen consumed as a result of combustion to the quantity of oxygen taken in the combustion chamber.

The quantity of oxygen taken in the combustion chamber can be obtained by multiplying the oxygen concentration (intake-gas oxygen concentration) of gas taken in the combustion chamber via the intake valve (hereinafter may be referred to as "intake gas"), which is measured by means of an intake-gas oxygen concentration sensor, by the total quantity of gas taken in the combustion chamber (hereinafter may be referred to as "cylinder interior total gas quantity"). The quantity of oxygen consumed as a result of combustion can be determined under the assumption that all injected fuel completely burns completely at the stoichiometric air-fuel ratio.

When the gas components (including oxygen molecules and $NO_x$) of intake gas taken in the combustion chamber are assumed to be uniformly distributed throughout the entire region of the combustion chamber, the ratio of the "quantity of oxygen consumed as a result of combustion" to the "quantity of oxygen taken in the combustion chamber" (hereinafter referred to as an "oxygen quantity ratio") accurately represents the ratio of the volume of the combustion region to that of the combustion chamber, and accordingly, represents the ratio of the quantity of $NO_x$ present in the combustion region before combustion to the total quantity of $NO_x$ taken in the combustion chamber (circulated into the combustion chamber via the EGR apparatus).

Accordingly, when the method is configured to estimate the combustion chamber by use of the oxygen quantity ratio, the combustion-region circulated $NO_x$ quantity (the quantity of a portion of $NO_x$ circulated into the combustion chamber, the portion being present within the combustion region before combustion) and the non-combustion-region circulated $NO_x$ quantity (the quantity of a portion of $NO_x$ circulated into the combustion chamber, the portion being present within the non-combustion region before combustion) can be obtained more accurately.

Moreover, in the $NO_x$ discharge quantity estimation method according to the present invention, when the internal combustion engine is configured to effect, in each operation cycle, at least one pilot injection and then main injection, the combustion-generated $NO_x$ quantity (the quantity of $NO_x$ generated upon completion of combustion of fuel injected through the main injection) is preferably estimated in consideration of influences of an inert gas generated as a result of the pilot injection.

In the case where main injection is performed after completion of pilot injection one or a plurality of times, an inert gas generated as a result of combustion of fuel injected through the pilot injection remains in the combustion region at the time when fuel injected through the main injection starts combustion in the combustion region, whereby the oxygen concentration in the combustion region decreases. Further, the highest combustion temperature of fuel injected through the main injection drops as a result of the thermal capacity of the inert gas remaining in the combustion chamber.

As is understood from above, the combustion-generated $NO_x$ quantity; i.e., quantity of $NO_x$ generated in the combustion region as a result of combustion, decreases in the case where a required amount of fuel is injected portionwise through pilot injection and main injection, as compared with the case where the required amount of fuel is injected at a single time.

Accordingly, in the case where pilot injection is performed at least one time before main injection, the above-mentioned configuration adapted to estimate the combustion-generated $NO_x$ quantity in consideration of influences of an inert gas generated as a result of the pilot injection can estimate the combustion-generated $NO_x$ quantity more accurately. The drop in the combustion-generated $NO_x$ quantity caused by the influence of the inert gas can be calculated as a function of, for example, fuel injection quantity at the time of pilot injection or timing of the pilot injection.

BRIEF DESCRIPTION OF THE DRAWINGS

FIG. 9 is a flowchart showing a routine which the CPU shown in FIG. 1 executes so as to compute an $NO_x$ discharge quantity.

BEST MODE FOR CARRYING OUT THE INVENTION

With reference to the drawings, there will now be described an control apparatus of an internal combustion engine (diesel engine), which apparatus performs an NOx discharge quantity estimation method according to an embodiment of the present invention.

Figure 1:
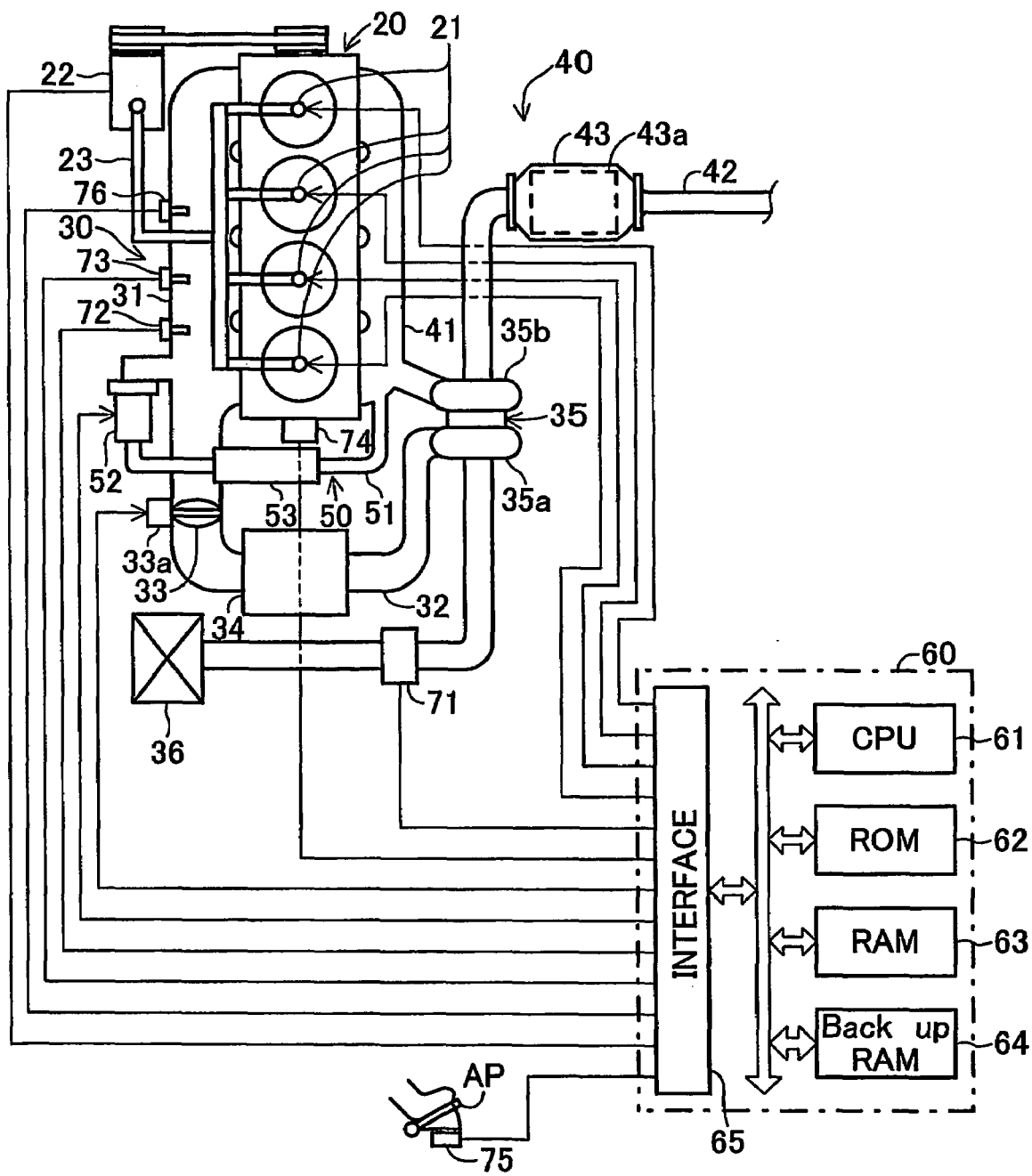
FIG. 1 a schematic diagram showing the overall configuration of a system in which an engine control apparatus, which performs an $NO_x$ discharge quantity estimation method for an internal combustion engine according to an embodiment of the present invention, is applied to a four-cylinder internal combustion engine (diesel engine).

FIG. 1 schematically shows the entire configuration of a system in which such an engine control apparatus is applied to a four-cylinder internal combustion engine (diesel engine)

10. This system comprises an engine main body 20 including a fuel supply system; an intake system 30 for introducing gas to combustion chambers (cylinder interiors) of individual cylinders of the engine main body 20; an exhaust system 40 for discharging exhaust gas from the engine main body 20; an EGR apparatus 50 for performing exhaust circulation; and an electronic control apparatus 60.

Fuel injection valves (injection valves, injectors) 21 are disposed above the individual cylinders of the engine main body 20. The fuel injection valves 21 are connected via a fuel line 23 to a fuel injection pump 22 connected to an unillustrated fuel tank. The fuel injection pump 22 is electrically connected to the electronic control apparatus 60. In accordance with a drive signal from the electronic control apparatus 60 (an instruction signal corresponding to a base fuel injection pressure Pcrbase to be described later), the fuel injection pump 22 pressurizes fuel in such a manner that the actual injection pressure (discharge pressure) of fuel becomes equal to the base fuel injection pressure Pcrbase.

Thus, fuel pressurized to the base fuel injection pressure Pcrbase is supplied from the fuel injection pump 22 to the fuel injection valves 21. Moreover, the fuel injection valves 21 are electrically connected to the electronic control apparatus 60. In accordance with a drive signal (an instruction signal corresponding to a fuel injection quantity qfin to be described later) from the electronic control apparatus 60, each of the fuel injection valves 21 opens for a predetermined period of time so as to inject, directly to the combustion chamber of the corresponding cylinder, the fuel pressurized to the base fuel injection pressure Pcrbase, in the fuel injection quantity qfin.

The intake system 30 includes an intake manifold 31, which is connected to the respective combustion chambers of the individual cylinders of the engine main body 20; an intake pipe 32, which is connected to an upstream-side branching portion of the intake manifold 31 and constitutes an intake passage in cooperation with the intake manifold 31; a throttle valve 33, which is rotatably held within the intake pipe 32; a throttle valve actuator 33a for rotating the throttle valve 33 in accordance with a drive signal from the electronic control apparatus 60; an intercooler 34, which is interposed in the intake pipe 32 to be located on the upstream side of the throttle valve 33; a compressor 35a of a turbocharger 35, which is interposed in the intake pipe 32 to be located on the upstream side of the intercooler 34; and an air cleaner 36, which is disposed at a distal end portion of the intake pipe 32.

The exhaust system 40 includes an exhaust manifold 41, which is connected to the individual cylinders of the engine main body 20; an exhaust pipe 42, which is connected to a downstream-side merging portion of the exhaust manifold 41; a turbine 35b of the turbocharger 35 interposed in the exhaust pipe 42; and a diesel particulate filter (hereinafter referred to as "DPNR") 43, which is interposed in the exhaust pipe 42. The exhaust manifold 41 and the exhaust pipe 42 constitute an exhaust passage.

The DPNR 43 is a filter unit which accommodates a filter 43a formed of a porous material such as cordierite and which collects, by means of a porous surface, the particulate matter contained in exhaust gas passing through the filter. In the DPNR 43, at least one metal element selected from alkaline metals such as potassium K, sodium Na, lithium Li, and cesium Cs; alkaline-earth metals such as barium Ba and calcium Ca; and rare-earth metals such as lanthanum La and yttrium Y is carried, together with platinum, on alumina serving as a carrier. Thus, the DPNR 43 also serves as a storage-reduction-type $NO_x$ catalyst unit which, after absorption of $NO_x$, releases the absorbed $NO_x$ and reduces it.

The EGR apparatus 50 includes an exhaust circulation pipe 51, which forms a passage (EGR passage) for circulation of exhaust gas; an EGR control valve 52, which is interposed in the exhaust circulation pipe 51; and an EGR cooler 53. The exhaust circulation pipe 51 establishes communication between an exhaust passage (the exhaust manifold 41) located on the upstream side of the turbine 35b, and an intake passage (the intake manifold 31) located on the downstream side of the throttle valve 33. The EGR control valve 52 responds to a drive signal from the electronic control apparatus 60 so as to change the quantity of exhaust gas to be circulated (exhaust-gas circulation quantity, EGR-gas flow rate).

The electronic control apparatus 60 is a microcomputer which includes a CPU 61, ROM 62, RAM 63, backup RAM 64, an interface 65, etc., which are connected to one another by means of a bus. The ROM 62 stores a program to be executed by the CPU 61, tables (lookup tables, maps), constants, etc. The RAM 63 allows the CPU 61 to temporarily store data when necessary. The backup RAM 64 stores data in a state in which the power supply is on, and holds the stored data even after the power supply is shut off. The interface 65 contains A/D converters.

The interface 65 is connected to a hot-wire-type airflow meter 71, which serves as air flow rate (new air flow rate) measurement means, and is disposed in the intake pipe 32; an intake gas temperature sensor 72, which is provided in the intake passage to be located downstream of the throttle valve 33 and downstream of a point where the exhaust circulation pipe 51 is connected to the intake passage; an intake pipe pressure sensor 73, which is provided in the intake passage to be located downstream of the throttle valve 33 and downstream of the point where the exhaust circulation pipe 51 is connected to the intake passage; a crank position sensor 74; an accelerator opening sensor 75; and an intake-gas oxygen concentration sensor 76 provided in the intake passage to be located downstream of the throttle valve 33 and downstream of the point where the exhaust circulation pipe 51 is connected to the intake passage. The interface 65 receives respective signals from these sensors, and supplies the received signals to the CPU 61. Further, the interface 65 is connected to the fuel injection valves 21, the fuel injection pump 22, the throttle valve actuator 33a, and the EGR control valve 52; and outputs corresponding drive signals to these components in accordance with instructions from the CPU 61.

The hot-wire-type airflow meter 71 measures the mass flow rate of intake air (new air) passing through the intake passage (intake new air quantity per unit time), and generates a signal indicating the mass flow rate Ga (intake new air flow rate Ga). The intake gas temperature sensor 72 detects the temperature of the above-mentioned intake gas, and generates a signal representing the intake gas temperature Tb. The intake pipe pressure sensor 73 measures the pressure of intake gas (i.e., intake pipe pressure), and generates a signal representing the intake pipe pressure Pb.

The crank position sensor 74 detects the absolute crank angle of each cylinder, and generates a signal representing the crank angle CA and engine speed NE; i.e., rotational speed of the engine 10. The accelerator opening sensor 75 detects an amount by which an accelerator pedal AP is operated, and generates a signal representing the accelerator pedal operated amount Accp. The intake-gas oxygen concentration sensor 76 detects the oxygen concentration of intake gas (i.e., intake-gas oxygen concentration), and a signal representing intake-gas oxygen concentration RO2_in.

Outline of $NO_x$ Discharge Quantity Estimation Method

Figure 2:
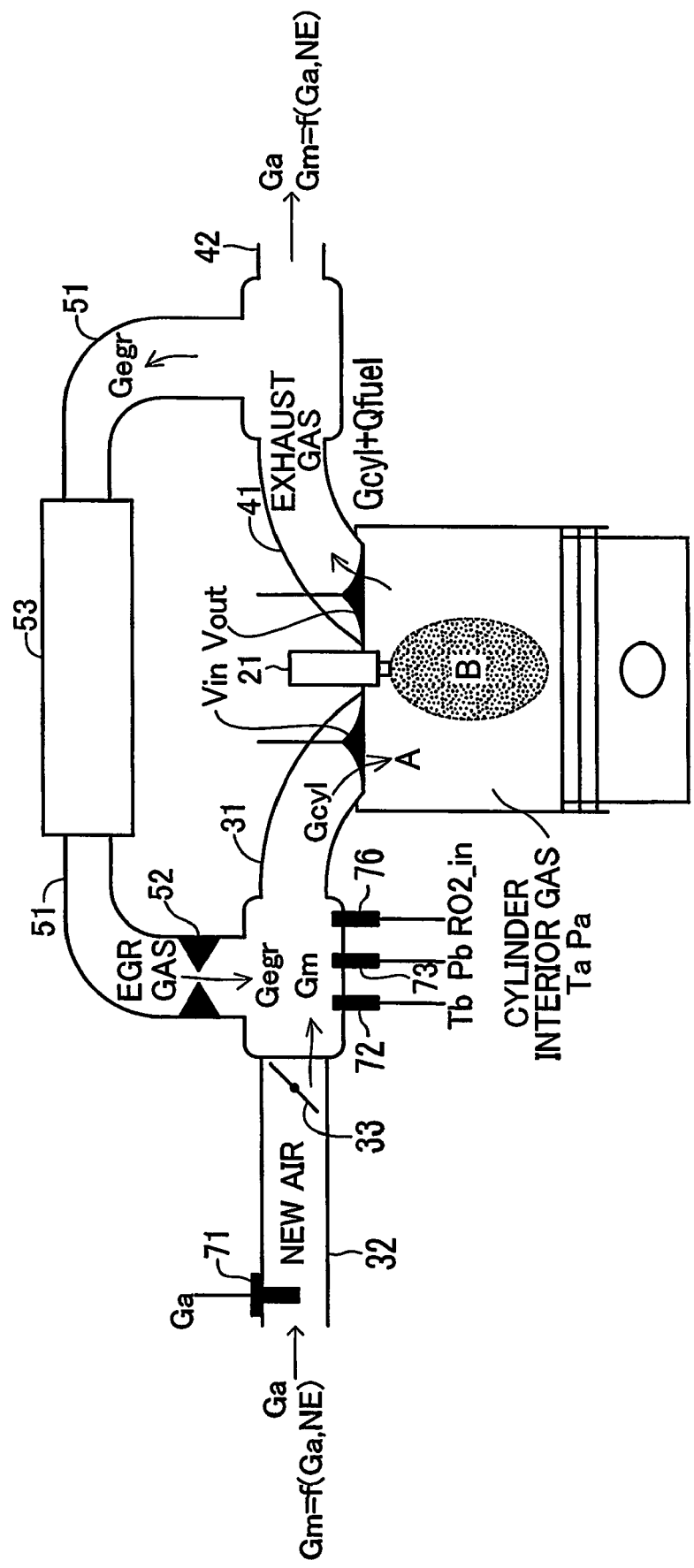
FIG. 2 is a diagram schematically showing a state in which gas is taken from an intake manifold to a certain cylinder and is then discharged to an exhaust manifold.

Next, there will be described an outline of an $NO_x$ discharge quantity estimation method according to the embodiment of the present invention performed by the control apparatus of the internal combustion engine having the above-described configuration (hereinafter may be referred to as the "present apparatus"). FIG. 2 is a diagram schematically showing a state in which gas (intake gas) is taken from the intake manifold 31 into a certain cylinder (cylinder interior) of the engine 10 and is then discharged to the exhaust manifold 41.

As shown in FIG. 2, intake gas (accordingly, cylinder interior gas) includes new air taken from the tip end of the intake pipe 32 via the throttle valve 33, and EGR gas (including $NO_x$) taken from the exhaust circulation pipe 51 via the EGR control valve 52. The mass ratio (i.e., EGR ratio) of the mass of the taken EGR gas (EGR gas mass) to the sum of the mass of the taken new air (new air mass) and the mass of the taken EGR gas (EGR gas mass) changes depending on the opening of the throttle valve 33 and the opening of the EGR control valve 52, which are properly controlled by the electronic control apparatus 60 (CPU 61) in accordance with the operating condition.

During an intake stroke, the intake gas (i.e., gas composed of the new air and the EGR gas containing $NO_x$) is taken in the cylinder via an opened intake valve Vin as the piston moves downward, and the thus-produced gas mixture serves as cylinder interior gas. The cylinder interior gas is confined within the cylinder when the intake valve Vin closes upon the piston having reached bottom dead center (hereinafter referred to as "ATDC-180°"), and then compressed in a subsequent compression stroke as the piston moves upward. When the piston reaches top dead center (specifically, when a final fuel injection timing finjfin to be described later comes), the present apparatus opens the corresponding fuel injection valve 21 for a predetermined period of time corresponding to the fuel injection quantity qfin, to thereby inject fuel directly into the cylinder. As a result, the injected fuel disperses in the cylinder with elapse of time, while mixing with the cylinder interior gas to produce a gas mixture. The gas mixture starts combustion by means of self ignition at a predetermined timing.

In the present embodiment, such combustion is assumed to occur only in a combustion region (hereinafter may be referred to as "region B"; see FIG. 2), which is a portion of the combustion chamber and is estimated as described later, and not to occur in a non-combustion region (hereinafter may be referred to as "region A"; see FIG. 2), which is the remaining portion of the combustion chamber other than the region B. Cylinder interior gas remaining in the combustion chamber after combustion is discharged, as exhaust gas, to the exhaust manifold 41 via the exhaust valve Vout, which is held open during the exhaust stroke, as the piston moves upward. The exhaust gas is then discharged to the outside via the exhaust pipe 42.

Next, there will be describe a specific $NO_x$ discharge quantity estimation method, which is applied to the internal combustion engine 10 equipped with the EGR apparatus 50, and which is performed by the present apparatus. In the $NO_x$ discharge quantity estimation method, upon arrival of each time when the final fuel injection timing finjfin for a cylinder to which fuel is injected (hereinafter referred to as "fuel injection cylinder"), the mass of $NO_x$ contained in exhaust gas (i.e., $NO_x$ discharge quantity, actual $NO_x$ discharge quantity NOxact) is estimated, the exhaust gas being discharged from the fuel injection cylinder to the outside via the exhaust valve Vout and the exhaust passage during the exhaust stroke immediately after the final fuel injection timing.

In this method, for estimation of the actual $NO_x$ discharge quantity NOxact, the ratio of the mass of $NO_x$ present in the above-described region B before combustion to the total mass of $NO_x$ taken in the combustion chamber (hereinafter referred to as "$NO_x$ quantity ratio RatioNOx"), the mass of $NO_x$ remaining in the above-described region A after the combustion, and the mass of $NO_x$ remaining in the above-described region B after the combustion must be estimated. Therefore, the methods for obtaining these values will be described with reference to FIG. 2.

<Method of Obtaining $NO_x$ Quantity Ratio RatioNOx>

Each of gas components, including oxygen molecules and NOx, of intake gas taken in the combustion chamber (cylinder interior gas) is assumed to be uniformly distributed over the entire region within the combustion chamber. Further, in this state, all oxygen present within the region B is assumed to be consumed by combustion. In this case, the ratio of the "mass of oxygen consumed by combustion" to the "total mass of oxygen taken in the combustion chamber" (i.e., the above-mentioned oxygen quantity ratio) represents the ratio of the volume of the region B to the volume of the combustion chamber, and also represents the ratio of the mass of $NO_x$ present in the region B before combustion to the total mass of $NO_x$ taken in the combustion chamber (accordingly, the above-mentioned $NO_x$ quantity ratio RatioNOx). In other words, the region B can be estimated by use of the oxygen quantity ratio.

Accordingly, the oxygen quantity ratio is obtained in order to obtain the $NO_x$ quantity ratio RatioNOx, and the "total mass of oxygen taken in the combustion chamber" and the "mass of oxygen consumed by combustion" must be obtained in order to obtain the oxygen quantity ratio.

The "total mass of oxygen taken in the combustion chamber" can be obtained through multiplication of the total mass of gas taken in the combustion chamber (hereinafter referred to as "cylinder interior total gas quantity Gcyl") by the oxygen concentration of the cylinder interior gas before combustion. The cylinder interior total gas quantity Gcyl can be obtained in accordance with Eq. (1), which is based on the state equation of gas at ATDC-180°.

$$Gcyl = (Pa0 \cdot Va0)/(R \cdot Ta0) \quad (1)$$

In Eq. (1), Pa0 is bottom-dead-center cylinder interior gas pressure; i.e., cylinder interior gas pressure at ATDC-180°. At ATDC-180°, the cylinder interior gas pressure is considered to be substantially equal to the intake pipe pressure Pb. Therefore, the bottom-dead-center cylinder interior gas pressure Pa0 can be obtained from the intake pipe pressure Pb detected by means of the intake pipe pressure sensor 73 at ATDC-180°. Va0 is bottom-dead-center combustion chamber volume; i.e., combustion chamber volume at ATDC-180°. The combustion chamber volume Va can be represented as a function of the crank angle CA on the basis of the design specifications of the engine 10. Therefore, the bottom-dead-center combustion chamber volume Va0 can be obtained on the basis of the function. Ta0 is bottom-dead-center cylinder interior gas temperature; i.e., cylinder interior gas temperature at ATDC-180°. At ATDC-180°, the cylinder interior gas temperature is considered to be substantially equal to the intake gas temperature Tb. Therefore, the bottom-dead-center cylinder interior gas temperature Ta0 can be obtained from the intake gas temperature Tb detected by means of the intake gas temperature sensor 72 at ATDC-180°. R is the gas constant of the cylinder interior gas.

Moreover, the oxygen concentration of the cylinder interior gas before combustion is considered to be substantially equal to the intake-gas oxygen concentration RO2_in at ATDC-180°. Therefore, the oxygen concentration of the cylinder interior gas before combustion can be obtained from the bottom-dead-center intake-gas oxygen concentration RO20_in detected by means of the intake-gas oxygen concentration sensor 76 at ATDC-180°. From the above, the "total mass of oxygen taken in the combustion chamber" can be represented as "Gcyl·RO20_in."

Meanwhile, the "mass of oxygen consumed by combustion" can be represented as "K·Qfuel" under the assumption that the entirety of injected fuel (i.e., fuel in the above-mentioned fuel injection quantity qfin) burns completely at the stoichiometric air-fuel ratio stoich. K is a coefficient, which is a value obtained through multiplication of the mass ratio (0.23) of oxygen contained in the atmosphere by the stoichiometric air-fuel ratio stoich (e.g., 14.6); i.e., "0.23·stoich." Qfuel is a value equal to the above-mentioned fuel injection quantity qfin. From the above, the $NO_x$ quantity ratio RatioNOx can be obtained in accordance with the following Eq. (2).

$$RatioNOx=(K \cdot Qfuel)/(Gcyl \cdot RO20\_in) \qquad (2)$$

<Method of Obtaining Mass of $NO_x$ Remaining in the Region A after Combustion>

As described above, in the present embodiment, combustion within the combustion chamber is assumed to occur only in the region B and not to occur in the region A. Therefore, of the mass of $NO_x$ circulated into the combustion chamber via the EGR apparatus 50, the mass of $NO_x$ present within the region A before combustion (hereinafter referred to as "A-region circulated $NO_x$ quantity NOxA") can be considered to be conserved (held) within the region A as it is, even after combustion. In other words, the A-region circulated $NO_x$ quantity NOxA directly represents the "the mass of $NO_x$ remaining in the region A after combustion."

The ratio of the mass of $NO_x$ present within the region A before combustion to the total mass of $NO_x$ taken in the combustion chamber can be represented by use of the above-mentioned $NO_x$ quantity ratio RatioNOx; i.e., represented as "1-RatioNOx." Therefore, the A-region circulated $NO_x$ quantity NOxA can be obtained through multiplication of the cylinder interior total gas quantity Gcyl by the $NO_x$ concentration of the cylinder interior gas before combustion and (1-RatioNOx). Since the $NO_x$ concentration of the cylinder interior gas before combustion can be considered to be substantially equal to the $NO_x$ concentration of intake gas (intake gas $NO_x$ concentration RNOx_in), the A-region circulated $NO_x$ quantity NOxA can be represented by the following Eq. (3).

$$NOxA=RNOx\_in \cdot (1-RatioNOx) \cdot Gcyl \qquad (3)$$

In Eq. (3), the intake gas $NO_x$ concentration RNOx_in is the mass ratio of the mass of $NO_x$ contained in the EGR gas circulated from the EGR apparatus 50 to the cylinder interior total gas quantity Gcyl. When the $NO_x$ concentration of EGR gas is assumed to be equal to the below-described exhaust gas $NO_x$ concentration RNOx_ex calculated in the previous operation cycle (at the time of fuel injection), the intake gas $NO_x$ concentration RNOx_in can be obtained in accordance with the following Eq. (4).

$$RNOx\_in=(RNOx\_ex \cdot Gegr)/Gcyl \qquad (4)$$

In Eq. (4), Gegr is the mass of EGR gas which has been taken, as a portion of intake gas, from the EGR apparatus 50 into the combustion chamber during the intake stroke of the present operation cycle, and can be obtained in accordance with the following Eq. (5).

$$Gegr=Gcyl-Gm \qquad (5)$$

In Eq. (5), Gm represents the mass (intake new air quantity) of new air which has been taken, as a portion of intake gas, from the tip end of the intake pipe 32 into the combustion chamber during the intake stroke of the present operation cycle, and is calculated on the basis of the intake new air quantity per unit time (intake new air flow rate Ga) measured by means of the airflow meter 71, the engine speed NE based on the output of the crank position sensor 74, and a function f(Ga, NE) which uses the intake new air flow rate Ga and the engine speed NE, as arguments, so as to obtain quantity of intake new air per intake stroke. A bottom-dead-center intake new air flow rate Ga0 and a bottom-dead-center engine speed NE0, which are detected by the corresponding sensors at ATDC-180°, are used as the intake new air flow rate Ga and the engine speed NE, respectively. As described above, the A-region circulated $NO_x$ quantity NOxA, and thus the "mass of $NO_x$ remaining in the region A after combustion" can be obtained in accordance with the above-described Eq. (3).

<Method of Obtaining Mass of $NO_x$ Remaining in the Region B after Combustion>

Of the mass of $NO_x$ circulated into the combustion chamber via the EGR apparatus 50, the mass of $NO_x$ present within the region B before combustion (hereinafter referred to as "B-region circulated $NO_x$ quantity NOxB2") can be represented by the following Eq. (6), as in the case of the A-region circulated $NO_x$ quantity NOxA represented by the above-described Eq. (3).

$$NOxB2=RNOx\_in \cdot RatioNOx \cdot Gcyl \qquad (6)$$

Meanwhile, as a result of combustion, $NO_x$ is generated in the region B (the quantity of such $NO_x$ will be referred to as "B-region combustion-generated $NO_x$ quantity NOxB1"). The B-region combustion-generated $NO_x$ quantity NOxB1 can be determined in accordance with the following Eq. (7), as a value obtained through multiplication of a combustion-generated $NO_x$ quantity per unit fuel quantity (hereinafter referred to as "combustion-generated $NO_x$ ratio RNOx_burn") by the above-mentioned fuel injection quantity Qfuel. The combustion-generated $NO_x$ ratio RNOx_burn is calculated on the basis of, for example, the fuel injection quantity Qfuel, the engine speed NE, and a function g(Qfuel, NE) which uses the fuel injection quantity Qfuel and the engine speed NE as arguments so as to obtain the combustion-generated $NO_x$ ratio.

$$NOxB1=RNOx\_burn \cdot Qfuel \qquad (7)$$

As described previously, the $NO_x$ quantity ($NO_x$ concentration) of a gas after combustion is determined, irrespective of $NO_x$ quantity ($NO_x$ concentration) before the combustion, by means of chemical equilibrium, in accordance with the temperature of gas after the combustion (in such a manner that the higher the gas temperature, the greater the $NO_x$ quantity ($NO_x$ concentration)).

Accordingly, in an ordinary operating state of the engine, in many cases the B-region combustion-generated $NO_x$ quantity NOxB1 (quantity of $NO_x$ generated within gas having an increased temperature as a result of combustion) becomes considerably greater than the B-region circulated $NO_x$ quantity NOxB2. Accordingly, basically, the B-region combustion-generated $NO_x$ quantity NOxB1 can be considered to be substantially equal to the "mass of $NO_x$ remaining in the region B after combustion").

However, in a case where the $NO_x$ concentration of EGR gas (accordingly, the below-described exhaust gas $NO_x$ concentration RNOx_ex calculated at the time of fuel injection in the previous operation cycle) is considerably high and fuel injection quantity qfin (=Qfuel) is very small because of a very small accelerator operated amount Accp, the B-region circulated $NO_x$ quantity NOxB2 increases, and the B-region combustion-generated $NO_x$ quantity NOxB1 decreases because of a small increase in gas temperature stemming from combustion. As a result, the B-region circulated $NO_x$ quantity NOxB2 becomes greater than the B-region combustion-generated $NO_x$ quantity NOxB1 in some cases. In such a case, the B-region circulated $NO_x$ quantity NOxB2, rather than the B-region combustion-generated $NO_x$ quantity NOxB1, is considered to be a more accurate representation of the "mass of $NO_x$ remaining in the region B after combustion".

As is understood from the above, the "mass of $NO_x$ remaining in the region B after combustion" can be obtained as the greater one of the B-region combustion-generated $NO_x$ quantity NOxB1, which is obtained in accordance with Eq. (7), and the B-region circulated $NO_x$ quantity NOxB2, which is obtained in accordance with Eq. (6) (the greater one will be referred to as "B-region final $NO_x$ quantity NOxB").

Once the A-region circulated $NO_x$ quantity NOxA, which is the "mass of $NO_x$ remaining in the region A after combustion," and the B-region final $NO_x$ quantity NOxB, which is the "mass of $NO_x$ remaining in the region B after combustion," are obtained, the total mass of $NO_x$ remaining in the combustion chamber after combustion can be obtained as "NOxA+NOxB." Moreover, the total mass of gas remaining in the combustion chamber after combustion can be obtained as "Gcyl+Qfuel."

Accordingly, the $NO_x$ concentration (exhaust gas $NO_x$ concentration RNOx_ex) of exhaust gas discharged from the combustion chamber to the exhaust passage (exhaust manifold 41) via the exhaust valve Vout during the exhaust stroke is equal to the mass ratio of the "total mass of $NO_x$ remaining in the combustion chamber after combustion" to the "total mass of gas remaining in the combustion chamber after combustion," and can be obtained in accordance with the following Eq. (8).

$$RNOx\_ex = (NOxA + NOxB)/(Gcyl + Qfuel) \qquad (8)$$

As described above, the previous value of the exhaust gas NOx concentration RNOx_ex obtained in accordance with Eq. (8) is used in the above-described Eq. (4) for obtaining the current value of the intake gas $NO_x$ concentration RNOx_in, under the assumption that the $NO_x$ concentration of exhaust gas flowing through the exhaust passage (exhaust manifold 41) is equal to the $NO_x$ concentration of EGR gas flowing through the exhaust circulation pipe 51.

When the $NO_x$ concentration of exhaust gas flowing through the exhaust passage (exhaust manifold 41 and exhaust pipe 42) is assumed to be constant over the entire region of the exhaust passage, the exhaust gas $NO_x$ concentration RNOx_ex becomes equal to the $NO_x$ concentration of exhaust gas discharged to the outside from the exhaust passage (specifically, the end of exhaust pipe 42).

Moreover, in an ordinary operation state (in particular, in a steady operation state) of the engine 10, the mass per operation cycle (exhaust stroke) of exhaust gas which is discharged to the outside from the exhaust passage (exhaust pipe 42) is substantially equal to the above-mentioned intake new air quantity Gm. As is understood from the above, the mass per operation cycle of $NO_x$ contained in exhaust gas which is discharged to the outside via the exhaust passage (the above-mentioned actual $NO_x$ discharge quantity NOxact) can be obtained in accordance with Eq. (9). Eq. (9) shows that as the EGR gas quantity Gegr increases, the intake new air quantity Gm decreases, whereby the actual $NO_x$ discharge quantity NOxact decreases. Accordingly, the phenomenon that the actual $NO_x$ discharge quantity NOxact decreases as the EGR gas quantity Gegr increases can be accurately expressed.

$$NOxact = RNOx\_ex \cdot Gm \qquad (9)$$

As described above, upon each arrival of the final fuel injection timing finjfin for the fuel injection cylinder, the present apparatus estimates, by use of Eqs. (1) to (9), the actual $NO_x$ discharge quantity NOxact; i.e., the mass of $NO_x$ discharged from the fuel injection cylinder via the exhaust valve Vout in the exhaust stroke immediately after the injection timing. The above is the outline of the $NO_x$ discharge quantity estimation method.

<Outline of Fuel Injection Control>

The present apparatus, which performs the above-mentioned $NO_x$ discharge quantity estimation method, calculates, at predetermined intervals, a target $NO_x$ discharge quantity per operation cycle NOxt on the basis of the above-mentioned fuel injection quantity qfin and engine speed NE. Subsequently, the present apparatus feedback-controls the final fuel injection start timing finjfin and the opening of the EGR control valve 52 in such a manner that the actual $NO_x$ discharge quantity NOxact estimated in the previous operation cycle coincides with the target $NO_x$ discharge quantity NOxt.

Specifically, when the actual $NO_x$ discharge quantity NOxact estimated in the previous operation cycle is greater than the target $NO_x$ discharge quantity NOxt, the final fuel injection start timing finjfin to be applied for the fuel injection cylinder in the present operation cycle is delayed from the base fuel injection start timing finjbase by a predetermined amount, and the opening of the EGR control valve 52 is increased from the current degree by a predetermined amount. As a result, the highest flame temperature of the fuel injection cylinder in the present operation cycle is controlled to decrease, whereby the actual $NO_x$ discharge quantity NOxact; i.e., the quantity of $NO_x$ discharged from the fuel injection cylinder to the outside in the present operation cycle, is rendered coincident with the target $NO_x$ discharge quantity NOxt.

Meanwhile, when the actual $NO_x$ discharge quantity NOxact estimated in the previous operation cycle is smaller than the target $NO_x$ discharge quantity NOxt, the final fuel injection start timing finjfin to be applied for the fuel injection cylinder in the present operation cycle is advanced from the base fuel injection start timing finjbase by a predetermined amount, and the opening of the EGR control valve 52 is decreased from the current degree by a predetermined amount. As a result, the highest flame temperature of the fuel injection cylinder in the present operation cycle is controlled to increase, whereby the actual $NO_x$ discharge quantity NOxact; i.e., the quantity of $NO_x$ discharged from the fuel injection cylinder to the outside in the present operation cycle, is rendered coincident with the target $NO_x$ discharge quantity NOxt. The above is the outline of fuel injection control.

Actual Operation

Next, actual operations of the control apparatus of the internal combustion engine having the above-described configuration will be described.

<Control of Fuel Injection Quantity, Etc.>

Figure 3:
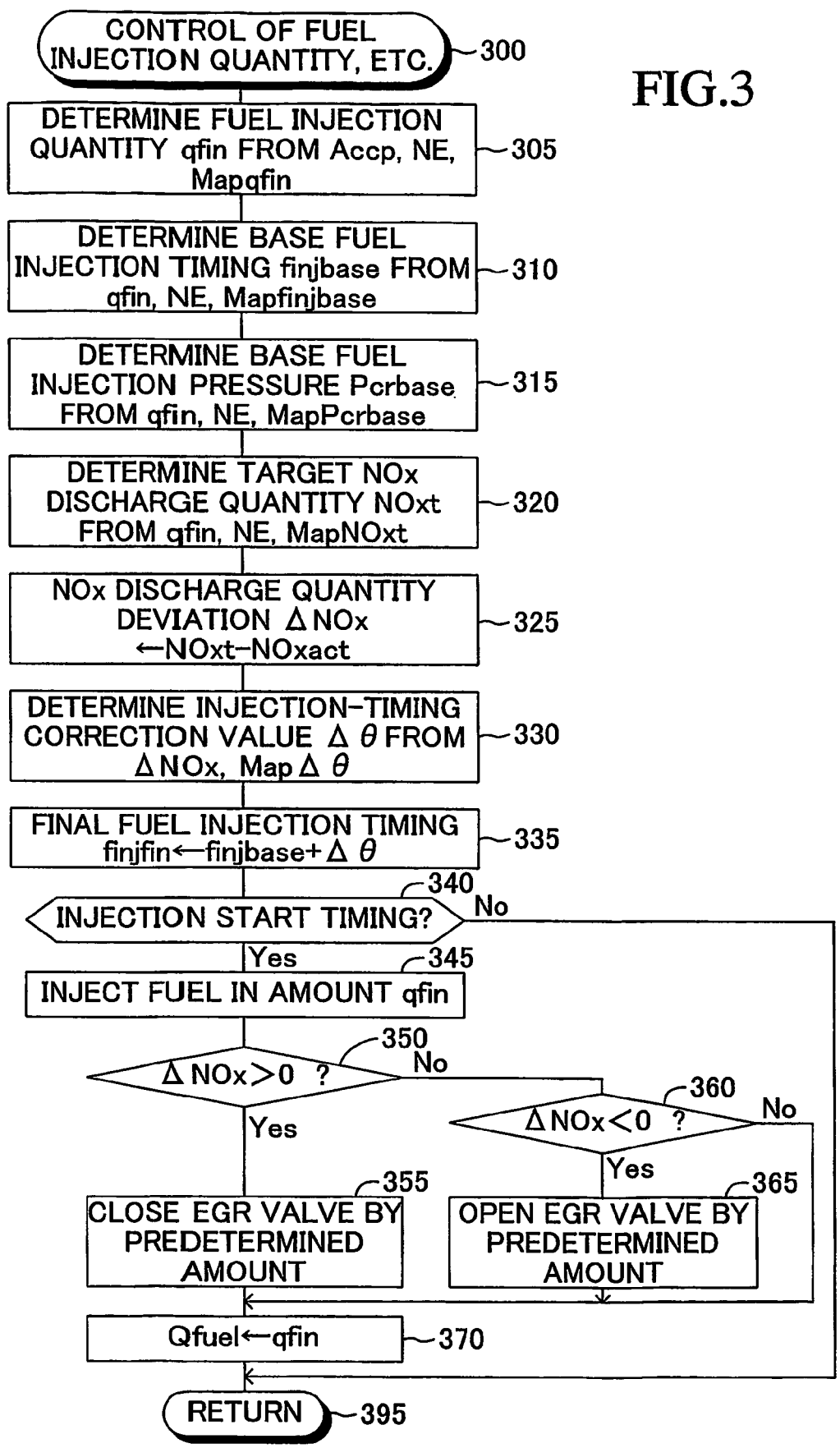
FIG. 3 is a flowchart showing a routine which the CPU shown in FIG. 1 executes so as to control fuel injection quantity, etc.
Figure 4:
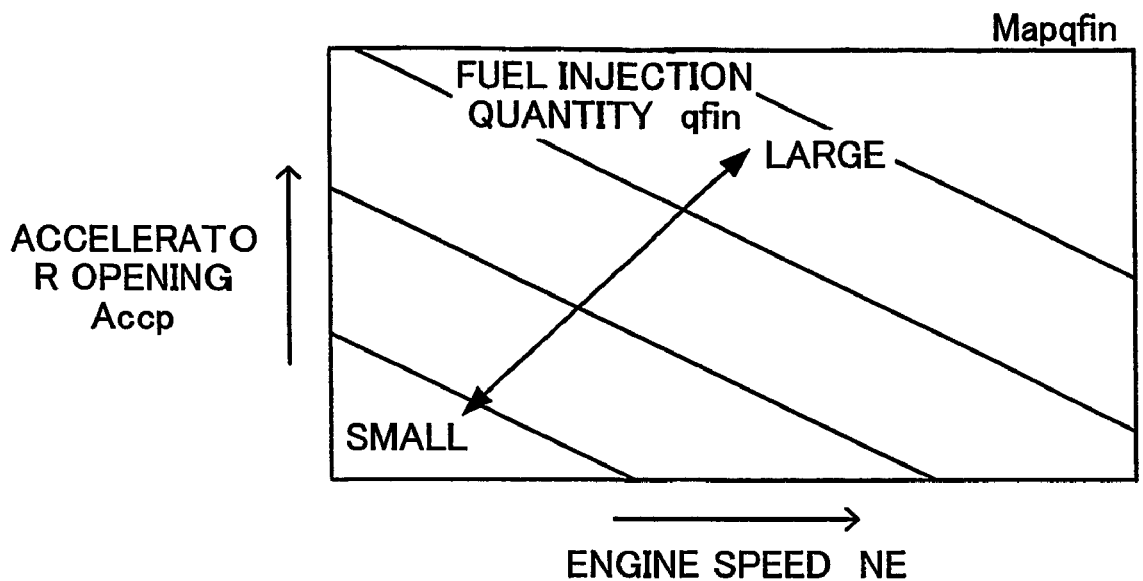
FIG. 4 is a table for determining a fuel injection quantity, to which the CPU shown in FIG. 1 refers during execution of the routine shown in FIG. 3.

The CPU 61 repeatedly executes, at predetermined intervals, a routine shown by the flowchart of FIG. 3 and adapted to control fuel injection quantity, etc. Therefore, when a predetermined timing has been reached, the CPU 61 starts the processing from step 300, and then proceeds to step 305 so as to obtain a fuel injection quantity qfin from an accelerator opening Accp, an engine speed NE, and a table (map) Mapqfin shown in FIG. 4. The table Mapqfin defines the relation between accelerator opening Accp and engine speed NE, and fuel injection quantity qfin; and is stored in the ROM 62.

Figure 5:
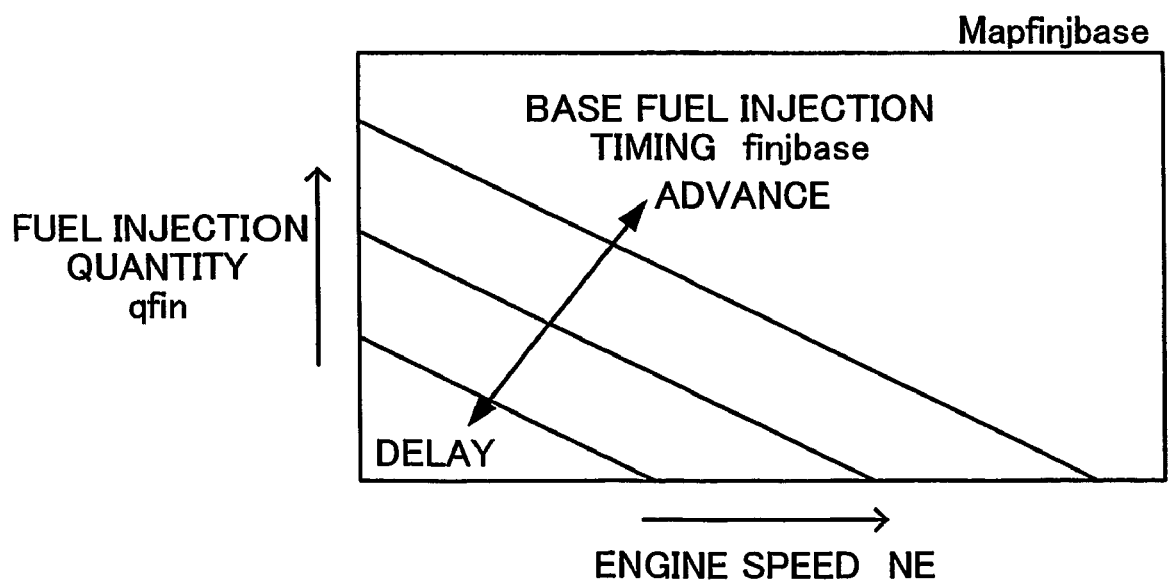
FIG. 5 is a table for determining a base fuel injection timing, to which the CPU shown in FIG. 1 refers during execution of the routine shown in FIG. 3.

Subsequently, the CPU 61 proceeds to step 310 so as to determine a base fuel injection timing finjbase from the fuel injection quantity qfin, the engine speed NE, and a table Mapfinjbase shown in FIG. 5. The table Mapfinjbase defines the relation between fuel injection quantity qfin and engine speed NE, and base fuel injection timing finjbase; and is stored in the ROM 62.

Figure 6:
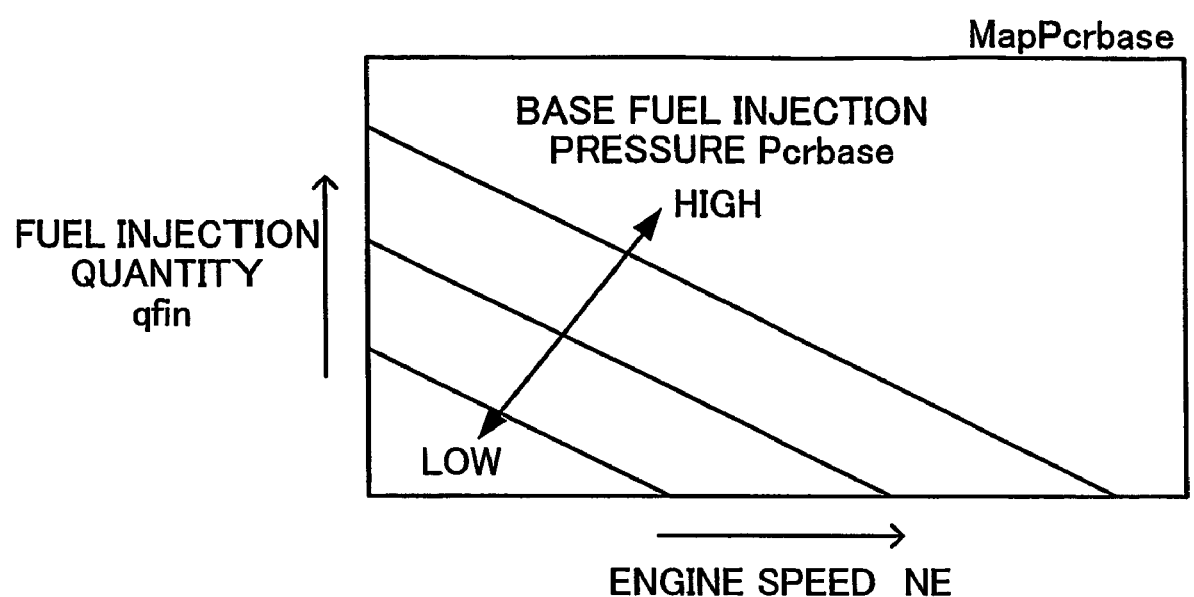
FIG. 6 is a table for determining a base fuel injection pressure, to which the CPU shown in FIG. 1 refers during execution of the routine shown in FIG. 3.

Subsequently, the CPU 61 proceeds to step 315 so as to determine a base fuel injection pressure Pcrbase from the fuel injection quantity qfin, the engine speed NE, and a table MapPcrbase shown in FIG. 6. The table MapPcrbase defines the relation between fuel injection quantity qfin and engine speed NE, and base fuel injection pressure Pcrbase; and is stored in the ROM 62.

Figure 7:
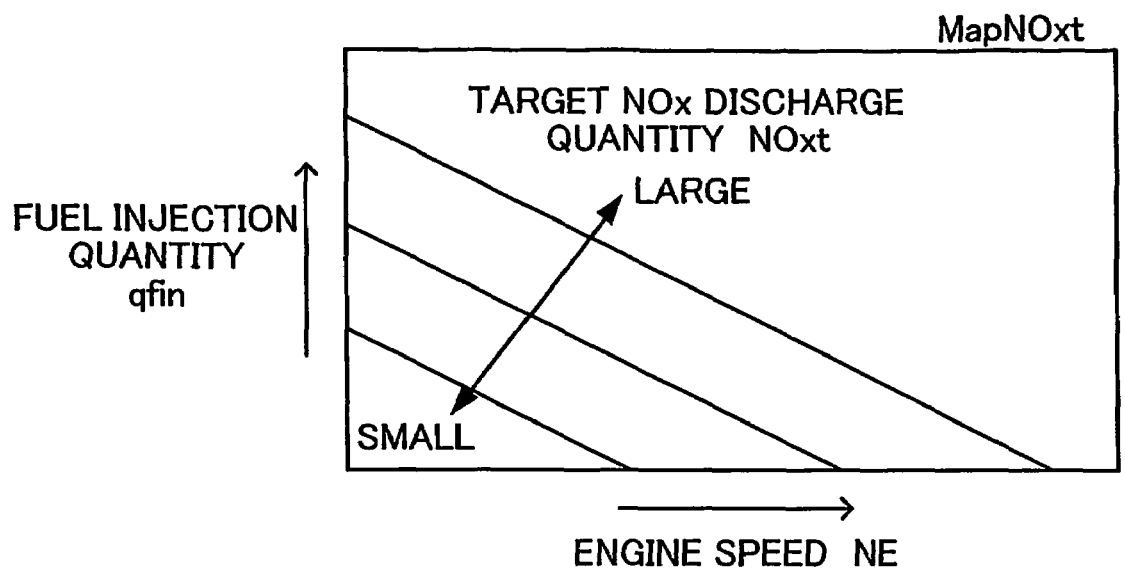
FIG. 7 is a table for determining a target $NO_x$ discharge quantity, to which the CPU shown in FIG. 1 refers during execution of the routine shown in FIG. 3.

Subsequently, the CPU 61 proceeds to step 320 so as to determine a target $NO_x$ discharge quantity NOxt from the fuel injection quantity qfin, the engine speed NE, and a table MapNOxt shown in FIG. 7. The table MapNOxt defines the relation between fuel injection quantity qfin and engine speed NE, and target NOx discharge quantity NOxt; and is stored in the ROM 62.

Subsequently, the CPU 61 proceeds to step 325 so as to store, as an $NO_x$ discharge quantity deviation ΔNOx, a value obtained through subtraction, from the target $NO_x$ discharge quantity NOxt, of the latest actual $NO_x$ discharge quantity NOxact, which is computed at a fuel injection timing in a previous operation cycle by a routine to be described later.

Figure 8:
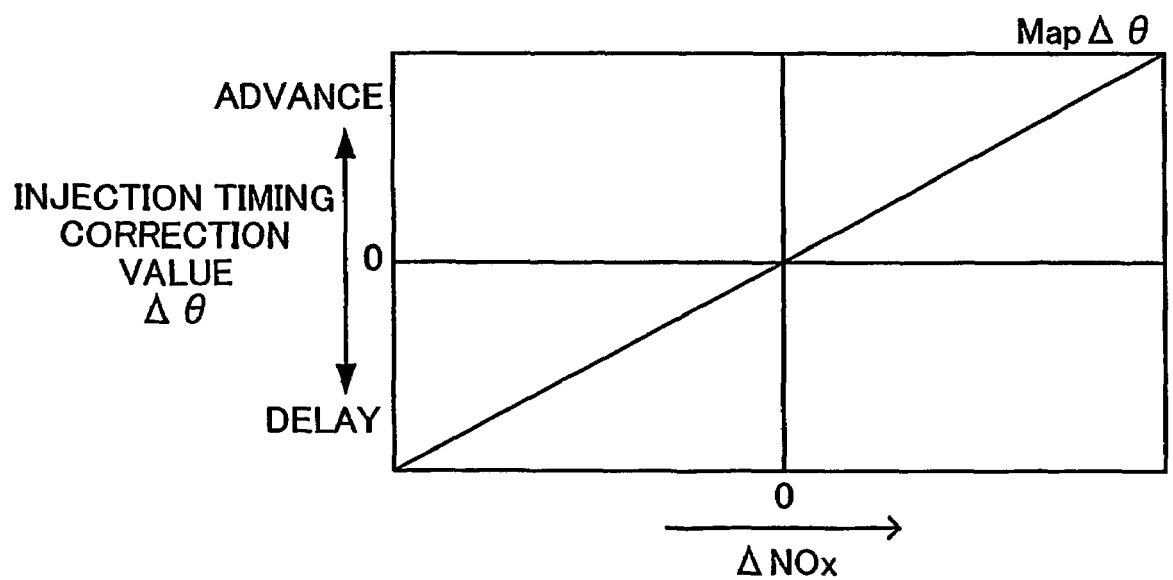
FIG. 8 is a table for determining an injection-timing correction value, to which the CPU shown in FIG. 1 refers during execution of the routine shown in FIG. 3.

Subsequently, the CPU 61 proceeds to step 330 so as to determine an injection-timing correction value Δθ from the $NO_x$ discharge quantity deviation ΔNOx and a table MapΔθ shown in FIG. 8. The table MapΔθ defines the relation between NOx discharge quantity deviation ΔNOx and injection-timing correction value Δθ, and is stored in the ROM 62.

Next, the CPU 61 proceeds to step 335 so as to correct the base fuel injection timing finjbase by the injection-timing correction value Δθ to thereby obtain a final fuel injection timing finjfin. Thus, the fuel injection timing is corrected in accordance with the $NO_x$ discharge quantity deviation ΔNOx. As is apparent from FIG. 8, when the $NO_x$ discharge quantity deviation ΔNOx is positive, the injection-timing correction value Δθ becomes positive, and its magnitude increases with the magnitude of the $NO_x$ discharge quantity deviation ΔNOx, whereby the final fuel injection timing finjfin is shifted toward the advance side. When the $NO_x$ discharge quantity deviation ΔNOx is negative, the injection-timing correction value Δθ becomes negative, and its magnitude increases with the magnitude of the $NO_x$ discharge quantity deviation ΔNOx, whereby the final fuel injection timing finjfin is shifted toward the retard side.

Subsequently, the CPU 61 proceeds to step 340 so as to determine whether the injection start timing (i.e., the final fuel injection timing finjfin) is reached for the fuel injection cylinder. When the CPU 61 makes a "No" determination in step 340, the CPU 61 proceeds directly to step 395 so as to end the current execution of the present routine.

In contrast, when the CPU 61 makes a "Yes" determination in step 340, the CPU 61 proceeds to step 345 so as to inject fuel in an amount of the fuel injection quantity qfin into the fuel injection cylinder from the fuel injection valve 21 at the base fuel injection pressure Pcrbase. In the subsequent step 350, the CPU 61 determines whether the $NO_x$ discharge quantity deviation ΔNOx is positive. When the CPU 61 makes a "Yes" determination in step 350, the CPU 61 proceeds to step 355 so as to reduce the opening of the EGR control valve 52 from the current degree by a predetermined amount. Subsequently, the CPU 61 proceeds to step 370.

When the CPU 61 makes a "No" determination in step 350, the CPU 61 proceeds to step 360 so as to determine whether the $NO_x$ discharge quantity deviation ΔNOx is negative. When the CPU 61 makes a "Yes" determination in step 360, the CPU 61 proceeds to step 365 so as to increase the opening of the EGR control valve 52 from the current degree by a predetermined amount. Subsequently, the CPU 61 proceeds to step 370. When the CPU 61 makes a "No" determination in step 360 (i.e., when the $NO_x$ discharge quantity deviation ΔNOx is zero), the CPU 61 proceeds to step 370 without changing the opening of the EGR control valve 52.

In this manner, the opening of the EGR control valve 52 is changed according to the $NO_x$ discharge quantity deviation ΔNOx. In step 370, the CPU 61 stores, as the value Qfuel, the fuel injection quantity qfin actually injected. Subsequently, the CPU 61 proceeds to step 395 so as to end the current execution of the present routine. Through the above-described processing, control of fuel injection quantity, fuel injection timing, fuel injection pressure, and opening of the EGR control valve 52 is achieved.

<Calculation of $NO_x$ Discharge Quantity>

Meanwhile, the CPU 61 repeatedly executes, at predetermined intervals, a routine shown by the flowcharts of FIG. 9 and adapted to calculate actual $NO_x$ discharge quantity NOxact. Therefore, when a predetermined timing has been reached, the CPU 61 starts the processing from step 900, and then proceeds to step 905 so as to determine whether the crank angle CA at the present point in time coincides with ATDC-180°.

Description will be continued under the assumption that the crank angle CA at the present point in time has not yet reached ATDC-180°. In this case, the CPU 61 makes a "No" determination in step 905, and then proceeds directly to step 935 so as to determine whether the fuel injection start timing (i.e., the final fuel injection timing finjfin) for the fuel injection cylinder has come. Since the crank angle CA at the present point in time has not yet reached ATDC-180°, the CPU 61 makes a "No" determination in step 935, and then proceeds directly to step 995 so as to end the current execution of the present routine.

After that, the CPU 61 repeatedly performs the processing of steps 900, 905, 935, and 995 until the crank angle CA reaches ATDC-180°. When the crank angle CA has reached ATDC-180°, the CPU 61 makes a "Yes" determination when it proceeds to step 905, and then proceeds to step 910. In step 910, the CPU 61 stores, as bottom-dead-center cylinder interior gas temperature Ta0, bottom-dead-center cylinder interior gas pressure Pa0, bottom-dead-center intake new air flow rate Ga0, and bottom-dead-center engine speed NE0, respectively, the intake gas temperature Tb, the intake pipe pressure Pb, the intake new air flow rate Ga, and the engine speed NE, which are detected by means of the intake gas temperature sensor 72, the intake pipe pressure sensor 73, the airflow meter 71, and the crank position sensor 74, respectively, at the present point in time (ATDC-180°).

Subsequently, the CPU 61 proceeds to step 915 so as to store, as bottom-dead-center intake-gas oxygen concentration RO20_in, the intake-gas oxygen concentration RO2_in detected by means of the intake-gas oxygen concentration sensor 76 at the present point in time (ATDC-180°). In the subsequent step 920, the CPU 61 computes the cylinder interior total gas quantity Gcyl in accordance with the above-described Eq. (1). Here, the values stored at step 910 are employed as the bottom-dead-center cylinder interior gas pressure Pa0 and the bottom-dead-center cylinder interior gas temperature Ta0.

Subsequently, the CPU 61 proceeds to step 925 so as to compute an intake new air quantity Gm from the bottom-dead-center intake new air flow rate Ga0 and the bottom-dead-center engine speed NE0 in accordance with the above-defined function f. In the subsequent step 930, the CPU 61 computes an EGR gas quantity Gegr on the basis of the cylinder interior total gas quantity Gcyl computed in step 920 and the intake new air quantity Gm, and in accordance with the above-described Eq. (5). Subsequently, the CPU 61 proceeds to step 935 so as to make a "No" determination, and then proceeds to step 995 so as to end the current execution of the present routine.

After that, the CPU 61 repeatedly performs the processing of steps 900, 905, 935, and 995 until the fuel injection timing (i.e., the final fuel injection timing finjfin) comes. When the final fuel injection timing finjfin comes, the CPU 61 makes a "Yes" determination in step 935 and then proceeds to step 940 so as to calculate the intake gas $NO_x$ concentration RNOx_in in accordance with the above-described Eq. (4). Here, the values computed in steps 930 and 920 are employed as the EGR gas quantity Gegr and the cylinder interior total gas quantity Gcyl, respectively. The value which has been computed in step 975 (to be described later) at the fuel injection start timing in the previous operation cycle is employed as the exhaust gas $NO_x$ concentration RNOx_ex.

Subsequently, the CPU 61 proceeds to step 945 so as to compute an A-region circulated $NO_x$ quantity NOXA in accordance with the equation shown in the box of step 945 of FIG. 9; the equation corresponding to the above-described Eqs. (2) and (3). Here, the latest value stored in step 370 of FIG. 3 is employed as the value Qfuel. After that, the CPU 61 proceeds to step 950 so as to a combustion-generated NOx ratio RONx_burn on the basis of the value Qfuel, the engine speed NE at the present point in time, and the above-mentioned function g. In subsequent step 955, the CPU 61 obtain a B-region combustion-generated $NO_x$ quantity NOxB1 in accordance with the above-described Eq. (7).

Subsequently, the CPU 61 proceeds to step 960 so as to obtain a B-region circulated $NO_x$ quantity NOxB2 in accordance with the equation described in the box of step 960 and corresponding to the above-described Eqs. (2) and (6). In step 965, the greater one of the B-region combustion-generated $NO_x$ quantity NOxB1 and the B-region circulated $NO_x$ quantity NOxB2 is stored as a B-region final $NO_x$ quantity NOxB.

Subsequently, the CPU 61 proceeds to step 970 so as to obtain an exhaust gas $NO_x$ concentration RNOx_ex in accordance with the above-described Eq. (8). In step 975, the CPU 61 obtains an actual $NO_x$ discharge quantity NOxact in accordance with the above-described Eq. (9), and then proceeds to step 995 so as to end the current execution of the present routine. After that, the CPU 61 repeatedly performs the processing of steps 900, 905, 935, and 995 until ATDC-180° for the fuel injection cylinder comes again.

In the above-described manner, a new actual $NO_x$ discharge quantity NOxact is obtained each time the fuel injection start timing comes. The obtained new actual $NO_x$ discharge quantity NOxact is used in step 325 of FIG. 3 as described above. As a result, the final fuel injection timing finjfin and the opening of the EGR control valve 52 to be applied to the fuel injection cylinder in the next operation cycle are feedback-controlled on the basis of the new actual $NO_x$ discharge quantity NOxact.

As described above, in the $NO_x$ discharge quantity estimation method for an internal combustion engine according to the embodiment of the present invention, the gas components (e.g., oxygen molecules and $NO_x$) of intake gas taken in the combustion chamber are assumed to be uniformly distributed throughout the entire region of the combustion chamber. Under such assumption, the combustion chamber is divided into a combustion region (region B) and a non-combustion region (region A) by making use of the ratio of the "mass of oxygen consumed by combustion" to the "total mass of oxygen taken in the combustion chamber." Further, under the assumption that $NO_x$ generated as a result of combustion remains in the region B after combustion (the actual $NO_x$ quantity is the above-mentioned B-region final $NO_x$ quantity NOxB), and circulated $NO_x$ present in the region A before combustion (the quantity of circulated $NO_x$ is the above-mentioned A-region circulated $NO_x$ quantity NOxA) is conserved (remains) after combustion, the actual $NO_x$ discharge quantity NOxaxt (the actual quantity of $NO_x$ discharged from the exhaust passage to the outside) is calculated in consideration of not only the combustion-generated $NO_x$ quantity in the region B but also the A-region circulated $NO_x$ quantity NOxA. Accordingly, the actual $NO_x$ discharge quantity NOxaxt can be accurately estimated.

The present invention is not limited to the above-described embodiment, and may be modified in various manners within the scope of the present invention. For example, the following modifications may be employed. In the above-described embodiment, $NO_x$ discharge quantity (actual $NO_x$ discharge quantity NOxaxt) is calculated every time the fuel injection start timing comes irrespective of the operating state of the engine 10. However, the embodiment may be modified in such a manner that the $NO_x$ discharge quantity is calculated only when the engine is in a predetermined steady operation state.

In the above-described embodiment, the above-mentioned B-region final $NO_x$ quantity NOxB, which is the greater one of the above-mentioned B-region combustion-generated $NO_x$ quantity NOxB1, which is obtained in accordance with Eq. (7), and the above-mentioned B-region circulated $NO_x$ quantity NOxB2, which is obtained in accordance with Eq. (6), is employed as the "mass of $NO_x$ remaining in the region B after combustion." However, the B-region combustion-generated $NO_x$ quantity NOxB1 may be always employed as the "mass of $NO_x$ remaining in the region B after combustion."

In the above-described embodiment, the engine 10 is configured to inject fuel of a required amount (fuel injection quantity (qfin) at a single time in each operation cycle. However, in the case where the engine 10 is configured to inject fuel of the required amount by means of pilot injection and main injection in each operation cycle, in consideration of influences of an inert gas generated as a result of the pilot injection, the above-mentioned combustion-generated NOx ratio RNOx_burn may be corrected (decreased) by a predetermined amount on the basis of, for example, the fuel injection quantity at the time of the pilot injection or the timing of the pilot injection.

The invention claimed is:

1. An $NO_x$ discharge quantity estimation method for an internal combustion engine equipped with an EGR apparatus for circulating to an intake passage of the engine a portion of exhaust gas flowing through an exhaust passage of the engine, characterized by comprising the steps of:

estimating a combustion region, the combustion region being a region of the combustion chamber in which combustion occurs;

estimating, as a combustion-generated $NO_x$ quantity, a quantity of $NO_x$ generated within the combustion region as a result of combustion, and an $NO_x$ quantity in a non-combustion region, the non-combustion region being the remaining region of the combustion chamber; and estimating, on the basis of the combustion-generated $NO_x$ quantity and the $NO_x$ quantity in the non-combustion region, a quantity of $NO_x$ contained in exhaust gas discharged from the exhaust passage to the outside.

2. An $NO_x$ discharge quantity estimation method according to claim 1, wherein the $NO_x$ quantity in the non-combustion region to be estimated is a non-combustion-region circulated $NO_x$ quantity which represents a quantity of a portion of $NO_x$ circulated into the combustion chamber via the EGR apparatus, the portion of the circulated $NO_x$ being present in the non-combustion region before combustion.

3. An $NO_x$ discharge quantity estimation method according to claim 1, wherein when a combustion-region circulated $NO_x$ quantity is greater than the combustion-generated $NO_x$ quantity, the combustion-region circulated $NO_x$ quantity is employed as the combustion-generated NOx quantity, wherein the combustion-region circulated $NO_x$ quantity represents a quantity of a portion of $NO_x$ circulated into the combustion chamber via the EGR apparatus, the portion of the circulated $NO_x$ being present in the combustion region before combustion.

4. An $NO_x$ discharge quantity estimation method according to claim 1, further comprising the steps of:

estimating an $NO_x$ concentration of exhaust gas on the basis of the combustion-generated $NO_x$ quantity and the $NO_x$ quantity in the non-combustion region; and estimating the quantity of $NO_x$ discharged from the exhaust passage to the outside by multiplying the $NO_x$ concentration by a quantity of exhaust gas discharged from the exhaust passage to the outside.

5. An $NO_x$ discharge quantity estimation method according to claim 4, wherein the quantity of exhaust gas discharged from the exhaust passage to the outside is estimated to be equal to a quantity of new air taken in the intake passage.

6. An $NO_x$ discharge quantity estimation method according to claim 1, further comprising the steps of:

estimating a quantity of oxygen taken in the combustion chamber and a quantity of oxygen consumed by combustion; and estimating the combustion region on the basis of a ratio of the quantity of oxygen consumed by combustion to the quantity of oxygen taken in the combustion chamber.

7. An $NO_x$ discharge quantity estimation method according to claim 6, wherein the quantity of oxygen taken in the combustion chamber is obtained by multiplying an oxygen concentration of gas taken in the combustion chamber via an intake valve by a total quantity of gas taken in the combustion chamber.

8. An $NO_x$ discharge quantity estimation method according to claim 6, wherein the quantity of oxygen consumed by combustion is determined under the assumption that all injected fuel burns completely at the stoichiometric air-fuel ratio.

9. An $NO_x$ discharge quantity estimation method according to claim 1, wherein the internal combustion engine is configured to effect, in each operation cycle, at least one pilot injection and then main injection; and the combustion-generated $NO_x$ quantity is estimated in consideration of influences of an inert gas generated as a result of the pilot injection.

* * * * *